(12) United States Patent
Fuller et al.

(10) Patent No.: US 6,994,242 B2
(45) Date of Patent: Feb. 7, 2006

(54) FRICTION STIR WELD TOOL AND METHOD

(75) Inventors: Christian B. Fuller, Moorpark, CA (US); Murray W. Mahoney, Camarillo, CA (US); William H. Bingel, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 10/731,849

(22) Filed: Dec. 9, 2003

(65) Prior Publication Data

US 2005/0121497 A1 Jun. 9, 2005

(51) Int. Cl.
B23K 31/02 (2006.01)

(52) U.S. Cl. .................................................. 228/112.1
(58) Field of Classification Search ............. 228/112.1, 228/2.1
See application file for complete search history.

(56) References Cited

U.S. PATENT DOCUMENTS

| | | | |
|---|---|---|---|
| 5,165,589 A | 11/1992 | Nied et al. | |
| 5,240,167 A | 8/1993 | Ferte et al. | |
| 5,460,317 A | 10/1995 | Thomas et al. | |
| 5,469,617 A | 11/1995 | Thomas et al. | |
| 5,595,670 A | 1/1997 | Mombo-Caristan | |
| 5,829,664 A | 11/1998 | Spinella et al. | |
| 5,972,524 A | 10/1999 | Childress | |
| 6,168,067 B1 | 1/2001 | Waldron et al. | |
| 6,191,379 B1 | 2/2001 | Offer et al. | |
| 6,247,633 B1 | 6/2001 | White et al. | |
| 6,783,055 B2 * | 8/2004 | Ezumi et al. ............. | 228/112.1 |
| 2003/0019913 A1 * | 1/2003 | Ezumi et al. ............. | 228/112.1 |
| 2003/0116609 A1 | 6/2003 | Dracup et al. | |
| 2004/0035914 A1 * | 2/2004 | Hempstead ............... | 228/112.1 |
| 2004/0108359 A1 * | 6/2004 | Hashimoto et al. ........... | 228/21 |
| 2004/0195291 A1 * | 10/2004 | Andersson et al. .......... | 228/2.1 |

FOREIGN PATENT DOCUMENTS

| | | | |
|---|---|---|---|
| EP | 0810056 A2 | | 12/1997 |
| GB | 2306366 A | * | 5/1997 |
| GB | WO 99/52669 | * | 10/1999 |
| JP | 2002096183 A | * | 4/2002 |
| JP | 2003048083 A | * | 2/2003 |
| JP | 2004141897 A | * | 5/2004 |
| WO | WO 02/07924 A1 | | 1/2002 |
| WO | WO 02/074479 | | 9/2002 |
| WO | WO 02/092273 A1 | * | 11/2002 |

OTHER PUBLICATIONS

T. Fukuda, *Friction stir welding (FSW) process*; Welding International, Welding Institute, Abington, GB. vol. 15, No. 8, 2001, pp. 611-615 (XP-001058539). ISSN: 0950-7116.

\* cited by examiner

*Primary Examiner*—Jonathan Johnson
(74) *Attorney, Agent, or Firm*—Alston & Bird LLP (57) ABSTRACT

A rotatable tool for friction stir welding a workpiece and an associated apparatus and method are provided. The tool includes a first pin portion that extends from a shoulder and defines a contour surface opposite the shoulder. A second pin portion extends from the contour surface of the first pin portion. The contour surface, which mixes the material of the workpiece during welding, can increase the mixing of the material at the interface, thereby increasing the strength of the joint.

38 Claims, 9 Drawing Sheets

FRICTION STIR WELD TOOL AND METHOD

BACKGROUND OF THE INVENTION

1) Field of the Invention

The present invention relates to friction welding and, more specifically, to a tool and method for forming lap joints by friction stir welding.

2) Description of Related Art

Figure 1:
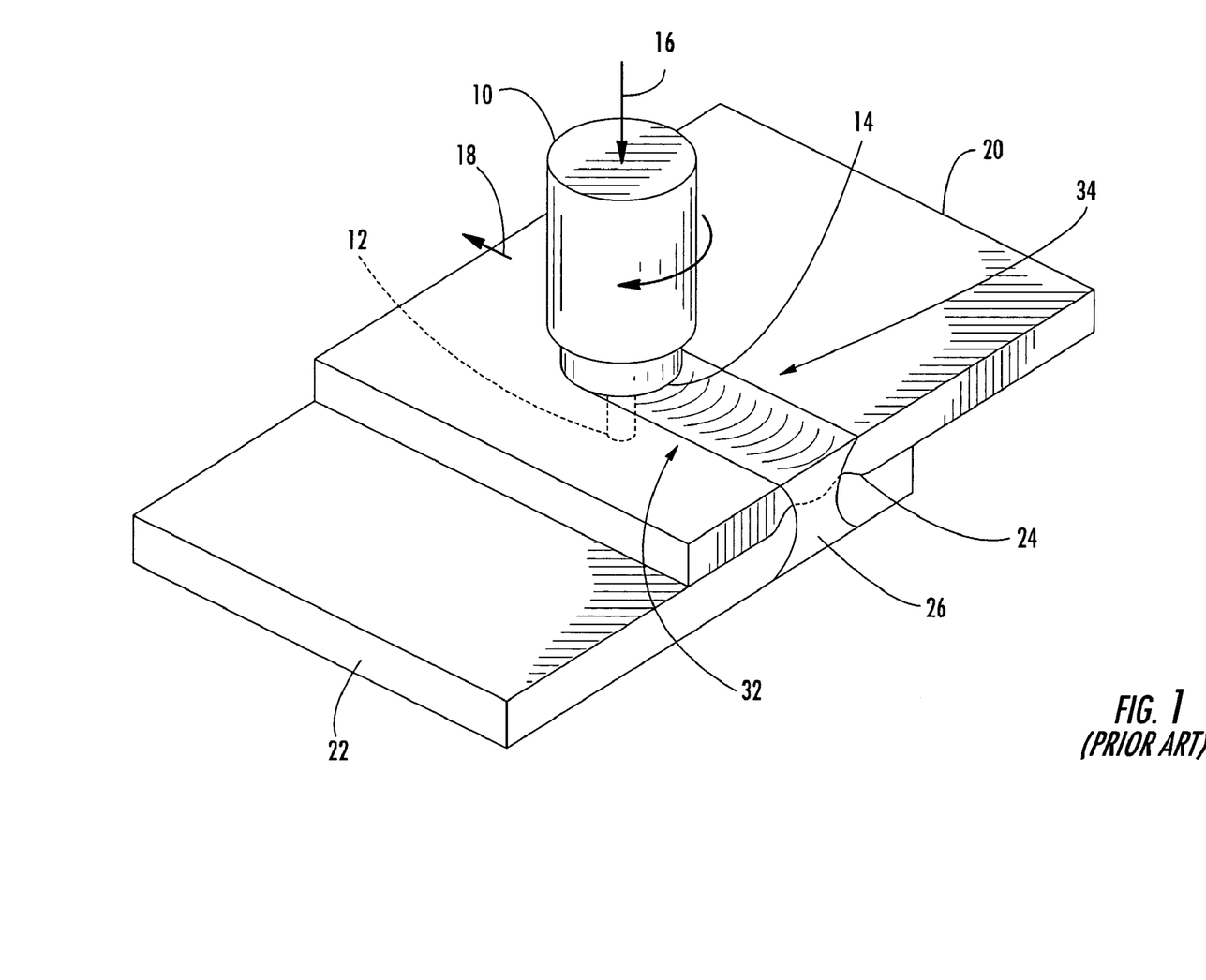
FIG. 1 is a perspective view illustrating a conventional friction stir welding device configured to form a friction stir weld lap joint between two overlapping structural members.

Friction stir welding is a process in which a rotating tool, such as a pin or probe, is urged into and/or through a workpiece, e.g., to join multiple structural members of the workpiece in a solid state or to repair cracks in a workpiece. As shown in FIG. 1, the pin 12 of the tool 10 typically extends from a shoulder 14, which can be flat, concave, or otherwise contoured, and the shoulder 14 is urged against the structural member 20 so that the pin 12 is urged into the structural members 20, 22. The pin 12 is then urged through the structural members 20, 22 to form a continuous weld joint 26. For example, according to one conventional friction stir welding process for forming a lap joint 26, a friction stir welding machine (not shown) urges the pin 12 in a direction 16 and into an interface 24 defined by the two overlapping structural members 20, 22. The rotating tool 10 is then moved in a direction 18 along the interface 24. The motion of the rotating tool 10 generates frictional and deformation heating, thereby forming a region of plasticized material in the structural members 20, 22. In some cases, the tool 10 is tilted approximately 2.5° relative to the structural members 20, 22 so that the trailing edge of the shoulder 14 is thrust into the plasticized material. Upon cooling of the plasticized material, the members 20, 22 of the workpiece are joined along the weld joint 26. Friction stir welding is further described in U.S. Pat. No. 5,460,317 to Thomas et al., the entire contents of which are incorporated herein by reference.

Friction stir welding has been demonstrated to be a successful joining method for forming typical butt joints. When forming a butt joint, the pin of the tool is inserted into the workpiece to extend substantially parallel to the interface between the structural members. Thus, the pin makes contact with the workpiece throughout the interface and mixes the material at the interface. During formation of a lap joint, however, the pin is typically inserted in a direction substantially perpendicular to the interface between the structural members. That is, as illustrated in FIG. 1, the structural members 20, 22 are overlapped to form the interface 24, and the pin 12 is inserted through the first structural member 20, through the interface 24, and then through at least a part of the second structural member 22. The mixing provided by the pin 12 is often insufficient to fully disperse the material throughout the interface 24. For example, mixing can be insufficient at the "retreating side" 34 of the weld joint 26, i.e., the transverse side of the weld joint 26 where the tangential direction of the rotational motion of the pin 12 is opposite the direction 18 of the advancement of the pin 12 through the structural members 20, 22. In some cases, mixing may also be insufficient at the opposite side, the "advancing side" 32 where the tangential direction of the rotational motion of the pin 12 corresponds to the direction 18 of the advancement of the pin 12. If the interface 24 is not sufficiently mixed, oxide layers that normally exist on the overlapping, or faying, surfaces of the structural members 20, 22 can still exist in a continuous, albeit deformed, configuration after the joint 26 is formed. The oxide layer at the interface 24 of the members 20, 22 extending through the joint 26 defines a weak portion of the joint 26 that is subject to failure during use.

In addition, friction stir welding of lap joints often results in a "thinning" of one or both of the structural members 20, 22 adjacent to the weld joint 26. Thinning generally refers to a condition in which the interface 24 between the members 20, 22 of a workpiece is deformed, i.e., either lifted or lowered toward the outer surface of a respective one of the members 20, 22. The thickness of the respective member 20, 22, as measured between the interface 24 and the outer surface of the member, is reduced, and the member 20, 22 is therefore subject to an increased risk of failure when stressed.

Conventional friction stir welding tools and methods have been shown to form weld joints in which the material of the workpiece is plasticized and mixed, and the resulting grain structure in the weld joint is refined. However, a need continues to exist for an improved friction stir weld tool and method for sufficiently mixing and refining the workpiece throughout a lap joint. Preferably, the tool and method should be capable of forming a lap joint, in which the joint extends substantially perpendicular through the interface.

SUMMARY OF THE INVENTION

The present invention provides a rotatable tool for friction stir welding a workpiece and an associated apparatus and method. The tool includes a first pin portion that extends from a shoulder and second pin portion that extends from the first pin portion. Advantageously, the first pin portion defines a contour surface opposite the shoulder. The contour surface, which mixes the material of the workpiece during welding, can increase the mixing of the material at the interface, thereby increasing the strength of the joint. The tool can also reduce the deformation of the interface. The workpiece can be formed of materials such as aluminum, aluminum alloys, titanium, titanium alloys, copper, copper alloys, magnesium, magnesium alloys, and ferrous alloys.

According to one embodiment of the present invention, the second pin portion extends longitudinally from the contour surface of the first pin portion and the second pin portion has a width in a transverse direction that is smaller than a width of the first pin portion. The contour surface of the first pin portion defines at least one ridge extending in a spiral configuration, e.g., in a continuous spiral configuration from the second pin portion to an outer diameter of the contour surface. The first pin portion can define a cylindrical outer surface, the contour surface can be parallel to the shoulder, and the second pin portion can be tapered in the longitudinal direction away from the contour surface. Further, the second pin portion can define at least one feature extending radially therefrom, such as a generally helical thread extending from an outer surface of the second pin portion.

According to another embodiment, the present invention provides an apparatus for forming a friction stir weld lap joint in a workpiece including first and second structural portions in a lap configuration and defining an interface therebetween. The apparatus includes a rotatable tool that has a shoulder, from which the first and second pin portions extend longitudinally. An actuator is connected to the tool and configured to rotate the tool and urge the tool in a longitudinal direction substantially perpendicular to the interface so that the shoulder is urged against the workpiece. Thus, the first pin portion pin extends at least partially through the first structural portion, and the second pin portion extends at least partially through the second structural portion. The first and second pin portions plasticize a portion of the workpiece and form a friction stir weld lap joint therein. According to one aspect, the first pin portion defines a length in the longitudinal direction that corresponds substantially to a thickness of the first structural portion of the workpiece. Thus, when the shoulder is urged against the first structural portion, the contour surface can be disposed, e.g., within about 0.050 inch, or within about 0.030 inch, from the interface.

The present invention also provides a method for forming a friction stir weld lap joint in a workpiece. The method includes positioning at least one structural member in an overlapping configuration to define an interface between first and second structural portions, rotating the friction stir welding tool, and urging the tool in a longitudinal direction substantially perpendicular to the interface. Thus, the pin extends through the interface. In particular, the first portion of the pin extends longitudinally from the shoulder at least partially through the first structural portion, and the second portion of the pin extends longitudinally from the contour surface of the first pin portion at least partially through the second structural portion. The pin portions thereby plasticize a portion of the workpiece and form a friction stir weld joint therein. The contour surface can be urged to a position near the interface, e.g., within about 0.050 inch from the interface or within about 0.030 inch from the interface.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
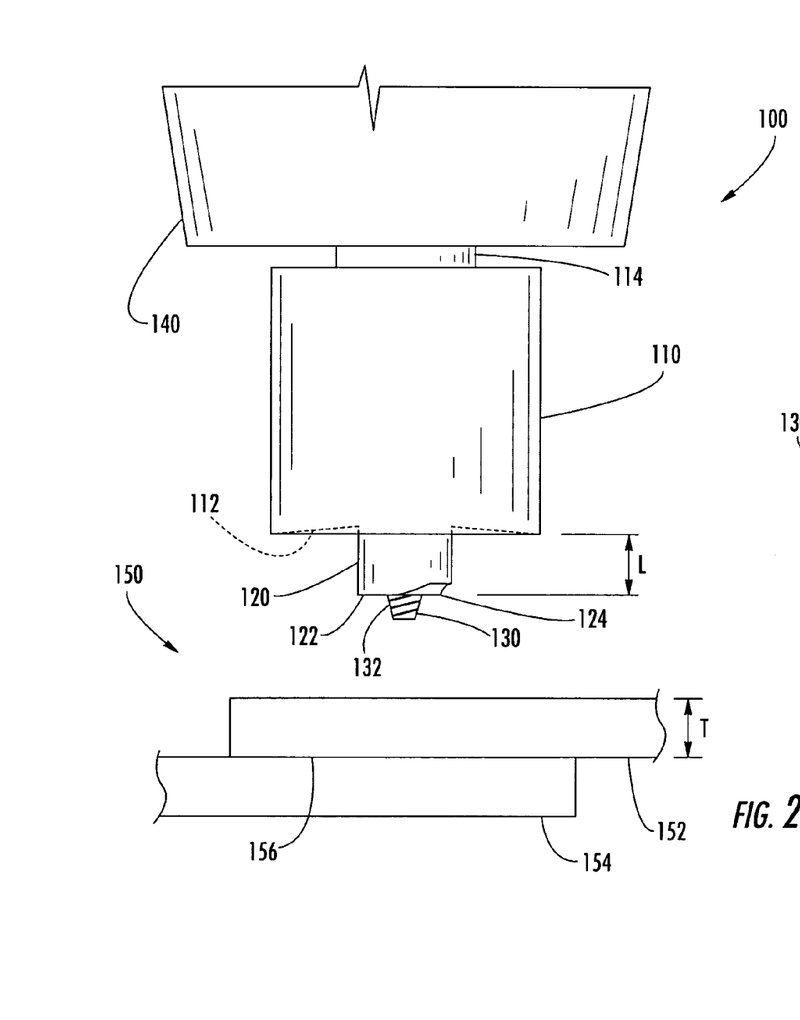
FIG. 2 is a side view illustrating an apparatus for friction stir welding according to one embodiment of the present invention.

Referring now to the drawings and, in particular, to FIG. 2, there is shown an apparatus 100 for friction stir welding a workpiece 150 according to one embodiment of the present invention. The term "workpiece" is not meant to be limiting, and it is understood that the workpiece 150 can include one or more structural portions, each of which can be a separate structural member 152, 154. The structural members 152, 154 can be configured in various configurations. Preferably, at least two structural members 152, 154 are positioned in an overlapping configuration to define an interface 156 therebetween that can be welded to form a lap joint. A lap weld joint generally extends at an angle relative to the interface, through one of the structural members, through the interface, and at least partially through the other structural member. For example, a lap weld joint can extend normal to outer surfaces of the structural members and the interface between the members. Alternatively, other types of joints can similarly be formed. For example, a butt joint can be formed by abutting the edge surfaces of the structural members 152, 154 and welding through an interface of the abutting surfaces. The structural members 152, 154 can also be positioned and welded in other configurations, and any number of structural members 152, 154 can be joined by the joint. In another embodiment, the structural portions of the workpiece 150 can be part of a single structural member and the friction stir weld joint can be formed in the single member, e.g., to join overlapping portions of the member, to repair a crack, hole, or other defect therein, or to affect the material properties of the structural member.

The structural members 152, 154 can be formed of a variety of materials including, but not limited to, aluminum, aluminum alloys, titanium, titanium alloys, steel, and the like. Further, the workpiece 150 can include members of similar or dissimilar materials, for example, structural members 152, 154 formed of different alloys of a base metal, including alloys that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits workpieces 150 formed of unweldable materials to be securely joined. Friction stir welding also can be used to securely join weldable materials to other weldable and to unweldable materials. Thus, the materials that form the workpiece 150 can be chosen from a wider variety of light weight, high strength metals and alloys, thereby facilitating reduction of the overall weight of the workpiece 150 and a structural assembly formed therefrom.

The workpiece 150 formed according to the methods of the present invention can be used in a variety of applications, including, for example, frames, panels, skins, airfoils, and the like for aeronautical and aerospace structures such as aircraft and spacecraft, for marine vehicles, automobiles, and the like, as well as for other applications outside of the transportation industry. The friction stir weld joints can be used for joining large workpieces and workpieces having curvilinear geometries. In some applications, the structural members 152, 154 are joined in geometrical configurations that make difficult, or prevent, access to the opposing sides of the workpiece 150. For example, the structural members 152, 154 can be joined to form a partially or fully closed body such as a tube or an airplane wing.

As illustrated in FIG. 2, the apparatus 100 includes a rotatable friction stir welding tool 110 and at least one actuator 140 for rotating the tool 110, urging the tool 110 against the workpiece 150, and moving the tool 110 through the workpiece 150 to form the joint extending therealong. The friction stir welding tool 110 defines a shoulder 112, from which a first pin portion 120 extends in a longitudinal direction. The first pin portion 120 defines a contour surface 122 opposite the shoulder 112, and a second pin portion 130 extends from the contour surface 122. The friction stir welding tool 110 is preferably formed of a material having high strength and heat resistance. For purposes of example only and not limitation, the pin portions 120, 130 and/or the shoulder 112 of the tool 110 can be constructed of tool steel, a molybdenum alloy, such as TZM, nickel alloys, such as Rene 41 (UNS N07041), or iron-nickel alloys.

The tool 110 can also define a shank 114 or other connection portion that can be engaged by a chuck, spindle, or other member of the actuator 140. The actuator 140 can be any of various types of actuating devices, including electric, hydraulic, or pneumatic devices. For example, the actuator 140 can be part of a machine, such as a milling machine or a drill, that is structured for rotating and moving the friction stir welding tool 110. The actuator 140 can be operated manually, but preferably is operated by a computer, microprocessor, microcontroller or other controller, which can be programmed to operate according to a schedule such as a schedule stored in or created by a computer software program.

Figure 5:
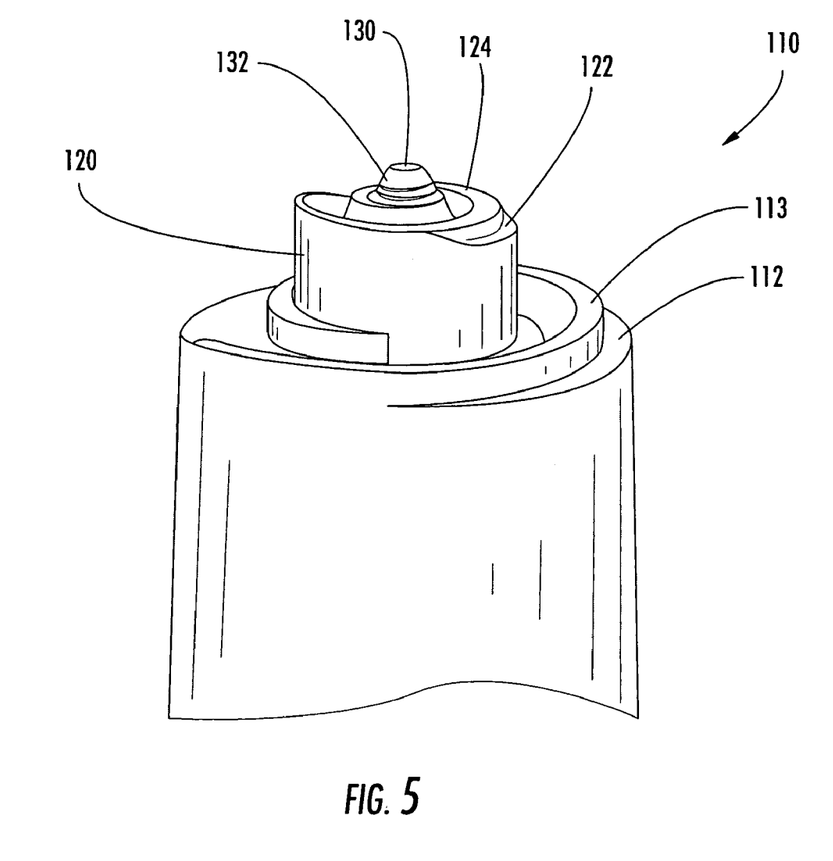
FIG. 5 is a perspective view illustrating a friction stir welding tool according to another embodiment of the present invention.

The shoulder 112 is structured to be urged against the workpiece 150 so that the pin portions 120, 130 are inserted into the workpiece 150, e.g., into the lap interface 156 as shown in FIG. 2. In other embodiments of the invention, the tool 110 can be a bobbin, i.e., a self-reacting tool that includes a second shoulder directed toward the first shoulder 112 with the pin portions 120, 130 extending therebetween. Thus, the two shoulders can be disposed opposite the workpiece 150 and frictionally engaged to opposite surfaces of the workpiece 150 while the pin portions 120, 130 extend through the workpiece 150. In either case, the shoulder(s) of the tool 110 can define a surface that is generally flat, tapered, concave, convex, or otherwise shaped, e.g., to engage the workpiece 150 and prevent "plowing," in which plasticized material from the workpiece 150 is pushed radially outside the circumference of the shoulder 112 as the tool 110 is moved along the workpiece 150. For example, as shown in FIG. 2, the shoulder 112 can be tapered so that the outer diameter of the shoulder 112 contacts the workpiece 150 and prevents plasticized material from flowing radially outward. Each shoulder 112 can also define a contour surface having one or more frictional features, e.g., raised portions or surfaces such as threads, bumps, or ribs that are structured to frictionally engage the workpiece 150. For example, as shown in FIG. 5, a spiral thread 113 can be provided on the shoulder 112 to frictionally engage the workpiece 150.

The urging force of the shoulder 112 against the workpiece 150 can be opposed by an anvil or other support device (not shown) positioned opposite the shoulder 112 or by a second shoulder connected to the pin portions 120, 130 and positioned opposite the workpiece 150. Thus, the workpiece 150 can be "sandwiched" between the shoulder 112 and the additional shoulder or support device during friction stir welding. Advantageously, the shoulder 112 and the second shoulder or other support device can create a seal that prevents the plasticized material from being extruded therefrom. Thus, planar or otherwise desired contours can be formed on the opposing sides of the workpiece 150 at the weld joint. The rotating friction stir welding tool 110 can be moved through the workpiece 150 along a predetermined path to thereby form an elongate weld joint. Thus, the material of the workpiece 150 can be mixed by the pin portions 120, 130, and the grain size of the material can be refined, possibly improving the material properties of the material at the joint.

Figure 3:
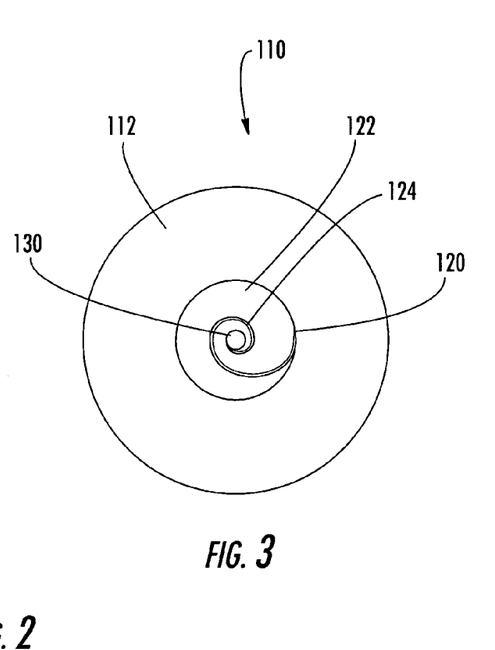
FIG. 3 is a bottom view illustrating the friction stir welding tool of the apparatus of FIG. 2.
Figure 4:
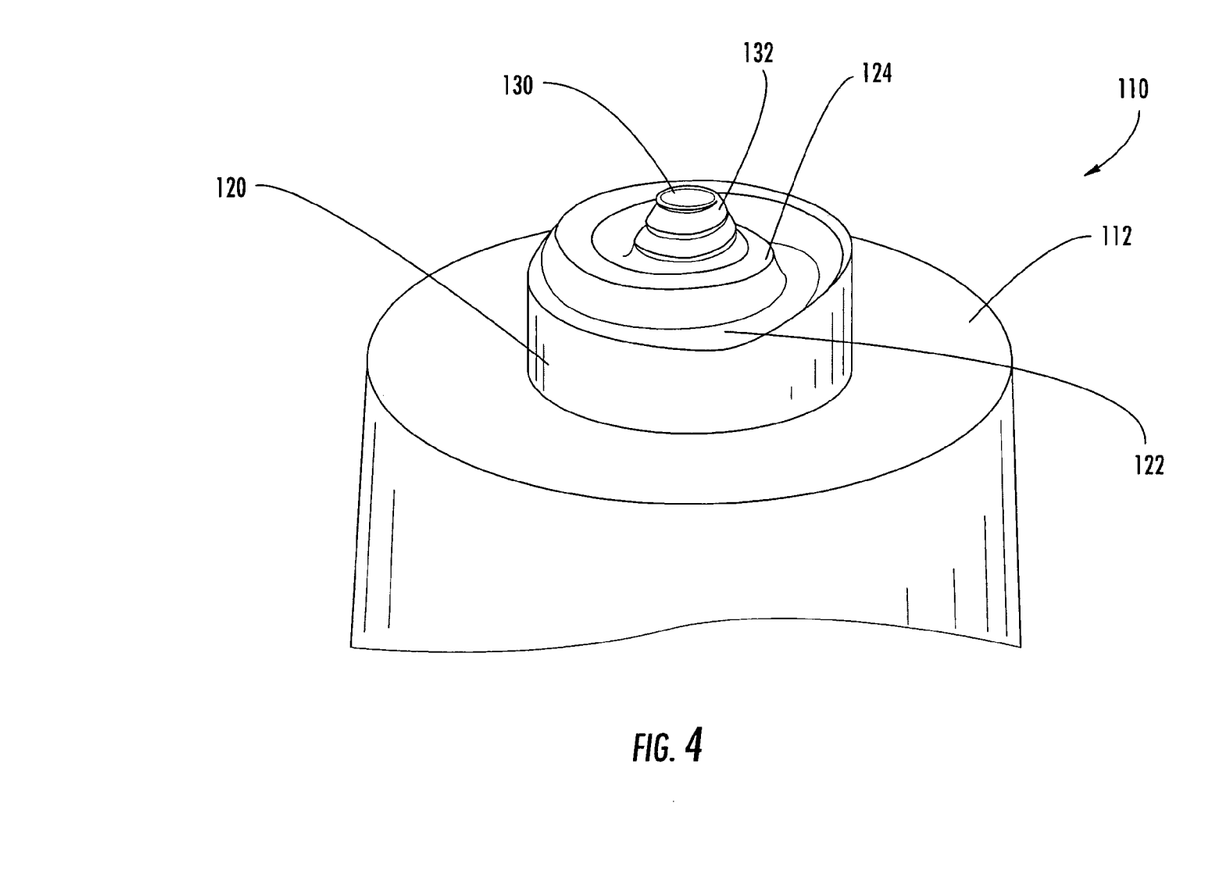
FIG. 4 is a perspective view illustrating the friction stir welding tool of the apparatus of FIG. 2.

The pin portions 120, 130 stir, or mix, the plasticized material of the workpiece 150 during welding. Advantageously, the surface 122 of the first pin portion 120 opposite the shoulder 112 is contoured and thus facilitates the mixing of the plasticized material. For example, as shown in FIGS. 3–5, the contour surface 122 can define a ridge 124 extending in a spiral configuration between the second pin portion 130 and an outer diameter of the first pin portion 120. The ridge 124 can extend continuously or only partially between the second pin portion 130 and the outer diameter of the first pin portion 120. Further, more than one ridge 124 can be defined on the contour surface 122. In some embodiments, the cross-sectional shape of the ridge 124 can vary along the length of the ridge 124 so that the ridge 124 extends by varying distances from the contour surface 122 or with varying widths. In addition, the second pin portion 130 can define one or more features extending radially therefrom. For example, the second pin portion 130 can define a helical thread 132 as shown in FIGS. 2, 4, and 5. In other embodiments of the present invention, the second pin portion 130 can define other features such as circumferential grooves, ridges, steps, and the like. The second pin portion 130 can also be tapered, as shown. Alternatively, the second pin portion 130 can be cylindrical or otherwise shaped.

During friction stir welding with the tool 110 of the present invention, the contour surface 122 of the first pin portion 120 can assist in plasticizing and dispersing the material of the workpiece 150. In particular, the contour surface 122 can increase the mixing of the material at the interface 156 to improve the quality of the resulting joint. According to one embodiment of the invention, the tool 110 can be structured so that the contour surface 122 is disposed proximate to the interface 156 during welding. That is, the first pin portion 120 can have a length L that corresponds to a thickness T of the first structural member 152 so that the contour surface 122 is disposed proximate to the interface 156 when the shoulder 112 is urged against the workpiece 150. More particularly, the first pin portion 120 can be about as long as the thickness T of the first structural member 152 or slightly longer or slightly shorter than the thickness T of the first structural member 152. The length L of the first pin portion 120 is generally measured between the shoulder 112 and the contour surface 122, including the ridge 124 as shown in FIG. 2. For example, the first pin portion 120 can be within about 0.050 inch of the thickness T of the first structural member 152, the first pin portion 120 being either longer or shorter than the first structural member 152, i.e., the first pin portion 120 being longer than about 0.050 inch less than the thickness T of the first structural member 152 and shorter than about 0.050 inch greater than the thickness T of the first structural member 152. In one embodiment of the present invention, the length of the first pin portion 120 is within about 0.030 inch of the thickness T of the first structural member 152. Preferably, the first pin portion 120 is not substantially shorter or longer than the thickness T of the first structural member 152, which could result in the contour surface 122 not affecting the mixing of the material at the interface 156 during formation of the joint. Thus, the contour surface 122 can enhance the mixing of the material of the workpiece 150 at the interface 156 so that the material at the interface 156 is sufficiently mixed and dispersed so that the resulting joint generally exhibits a sufficiently refined grain structure throughout. Further, the joint can be formed without substantially lifting, lowering, or otherwise deforming the interface 156.

Figure 6:
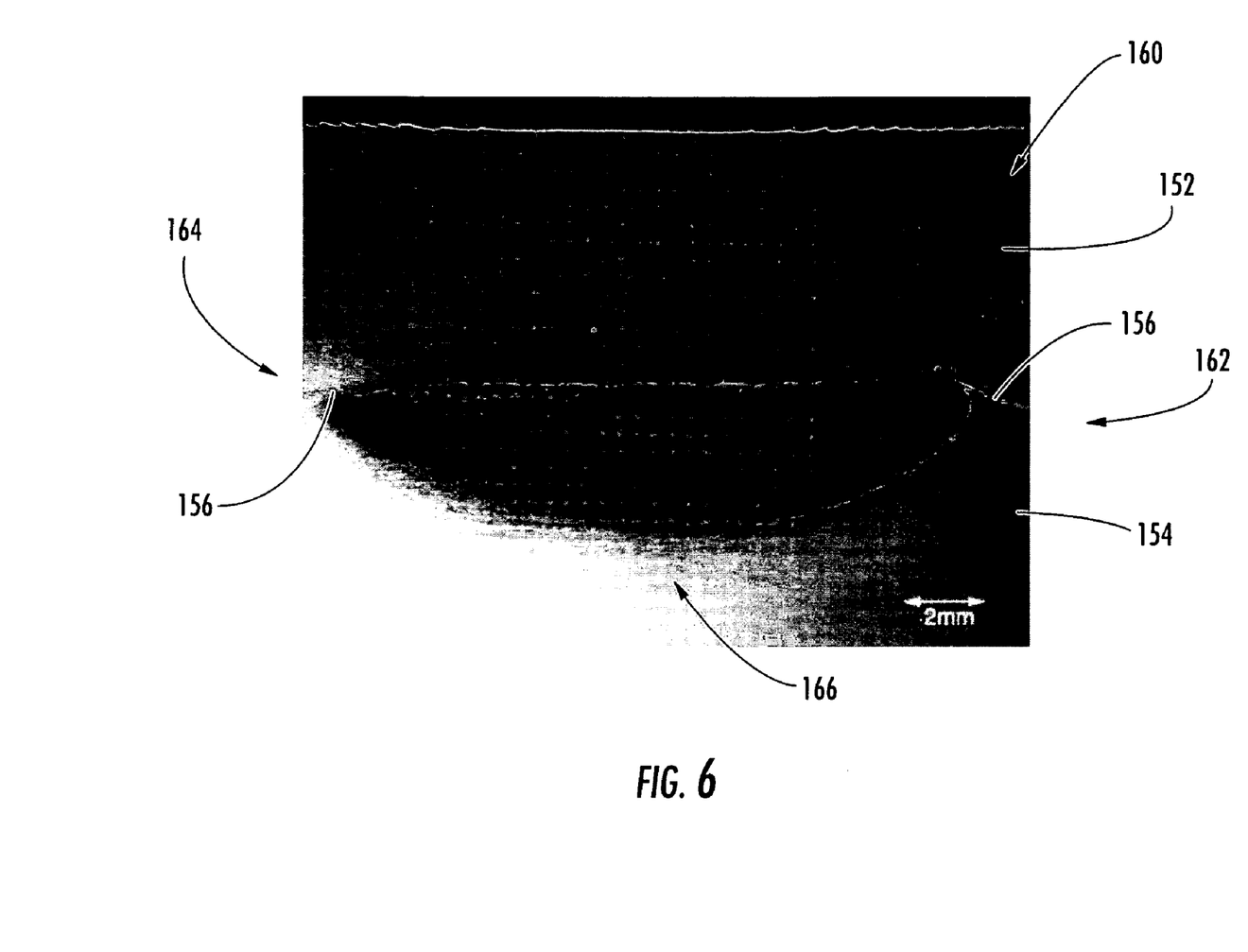
FIG. 6 is a section view illustrating a friction stir weld lap joint formed between two structural members according to one embodiment of the present invention.
Figure 7:
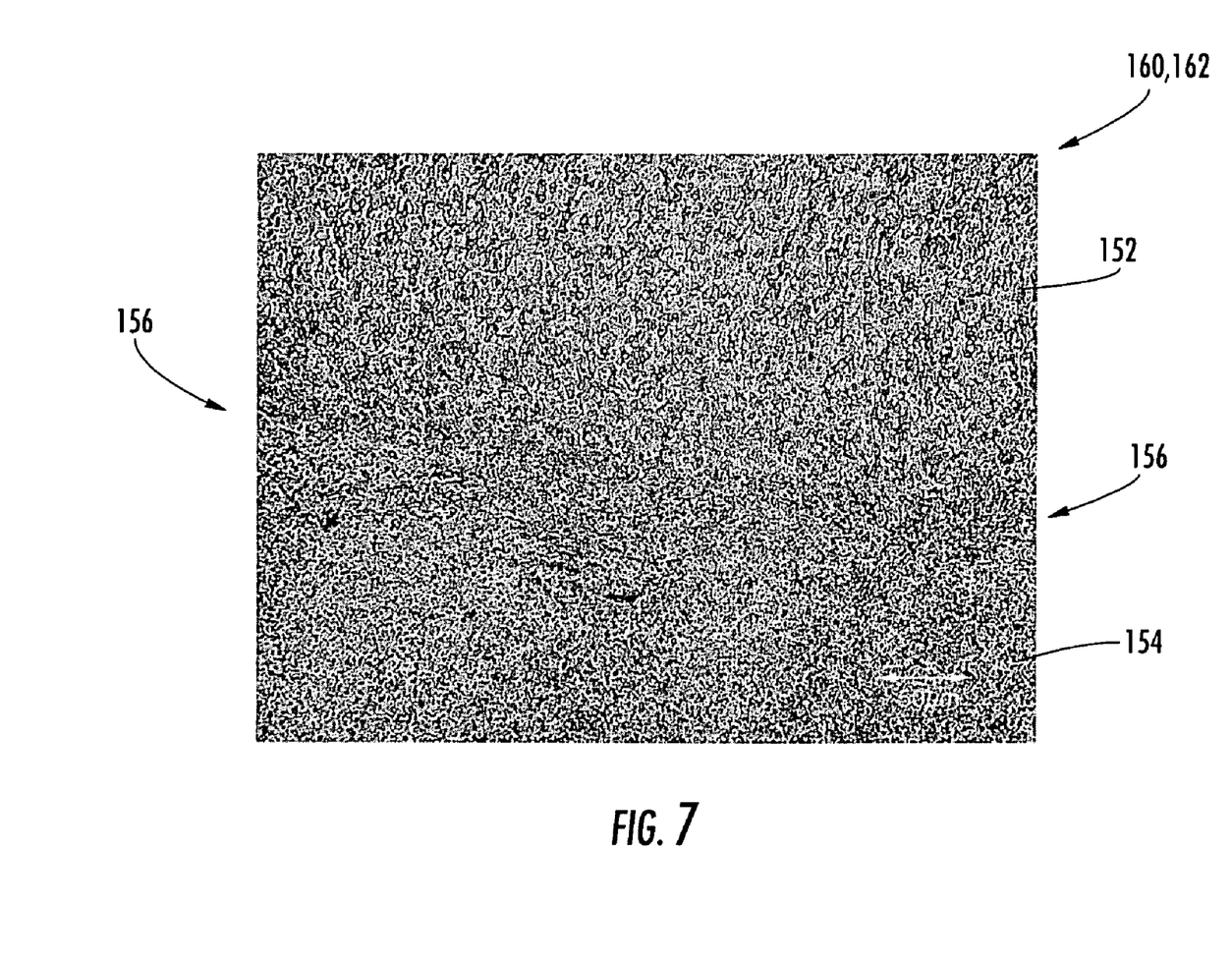
FIG. 7 is an enlarged section view illustrating a portion of the friction stir weld lap joint of FIG. 6 at the advancing side of the weld joint.
Figure 8:
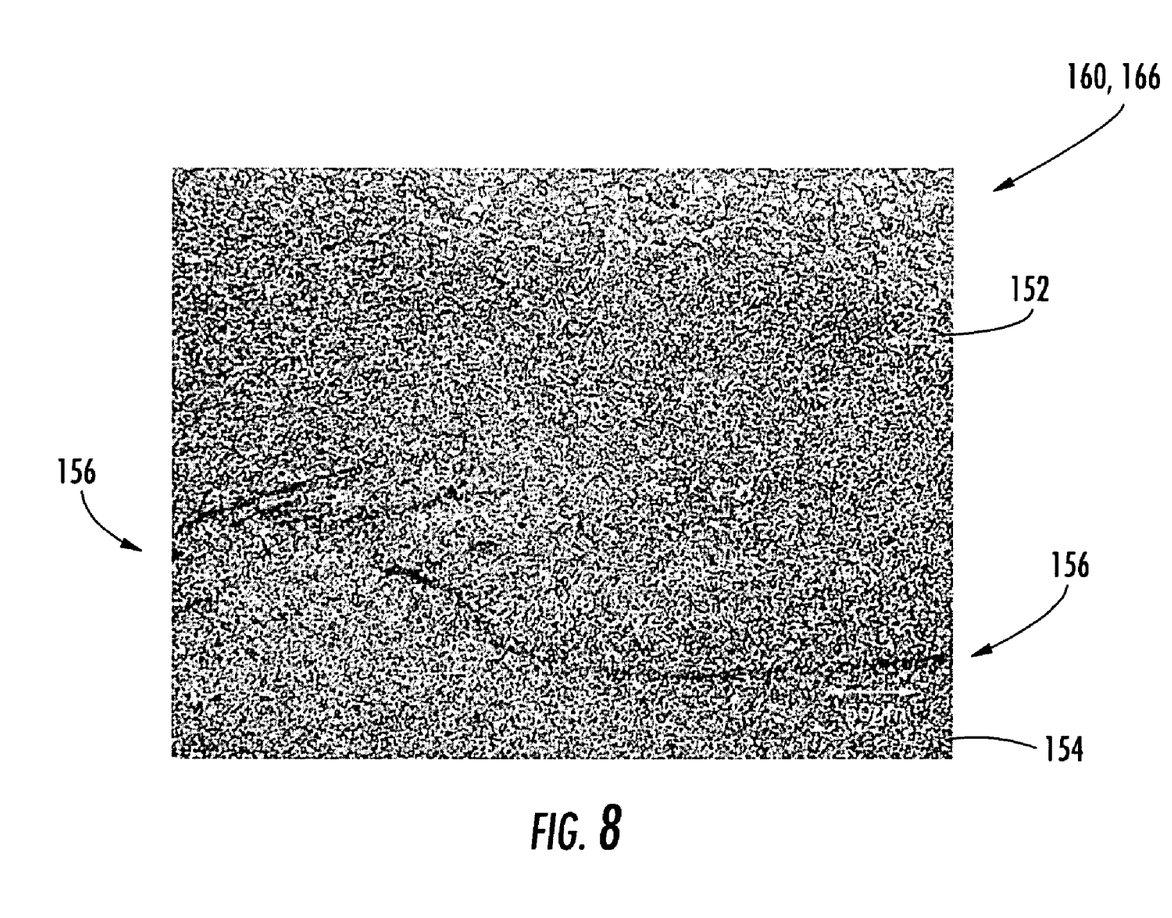
FIG. 8 is an enlarged section view illustrating a portion of the friction stir weld lap joint of FIG. 6 at the center side of the weld joint.
Figure 9:
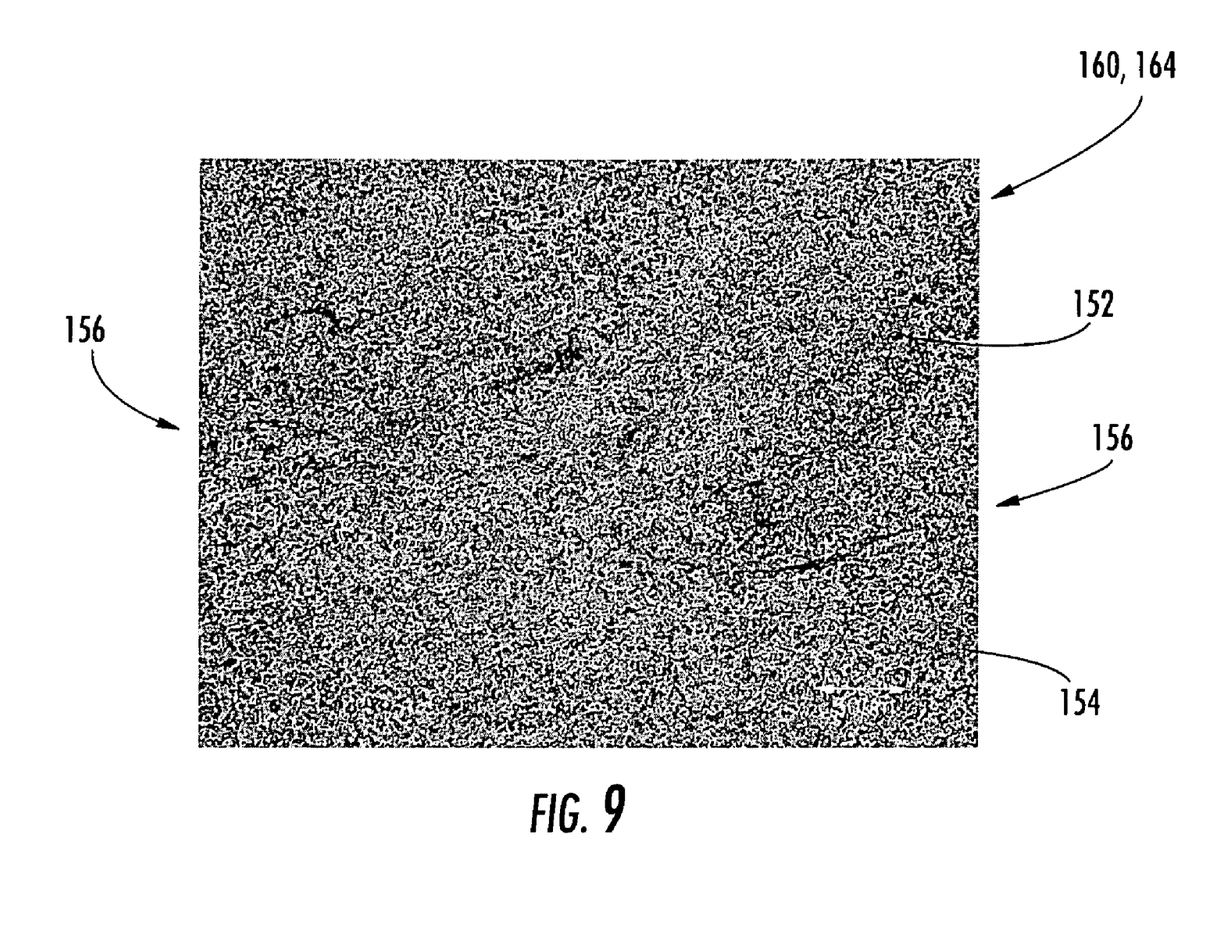
FIG. 9 is an enlarged section view illustrating a portion of the friction stir weld lap joint of FIG. 6 at the retreating side of the weld joint.

For example, FIGS. 6–9 illustrate a friction stir weld lap joint 160 formed between two structural members 152, 154 formed of 7050 aluminum. The joint 160 shown in FIG. 6 was formed with a friction stir welding tool 110 defining a first pin portion 120 having a length about 0.02 inch less than the thickness T of the first structural member 152 so that the contour surface 122 was configured about 0.02 inch above the interface 156 during welding. As shown in FIG. 6, the interface 156 is not substantially lifted or lowered at either an advancing side 162 or retreating side 164 of the joint 160. Further, the material at the interface 156 is well mixed, as can be better seen in the enlarged cross-sectional views provided in FIGS. 7–9 illustrating the advancing side 162, a center 166, and the retreating side 164 of the joint 160, respectively.

Figure 10:
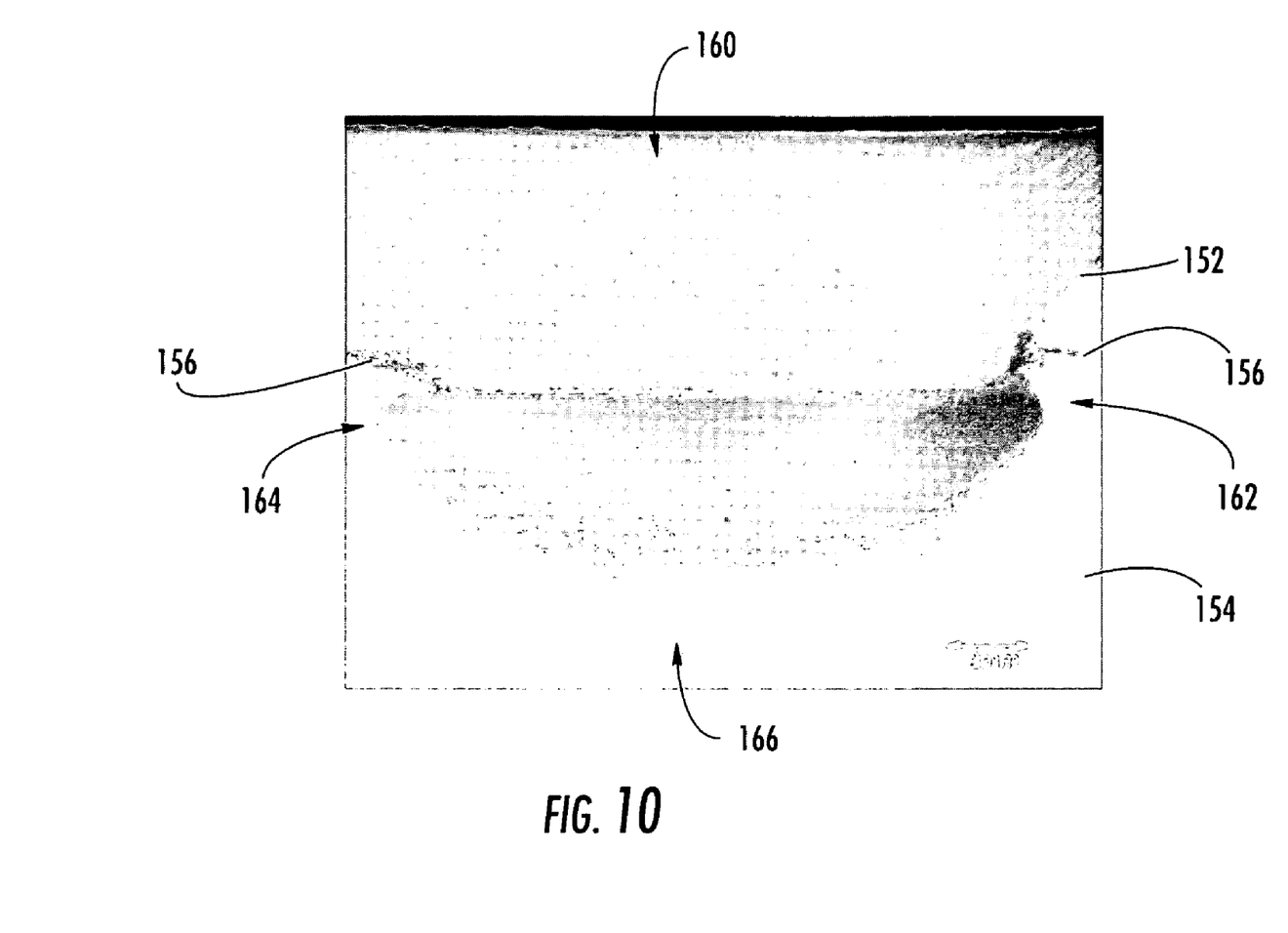
FIG. 10 is a section view illustrating a friction stir weld lap joint formed between two structural members according to another embodiment of the present invention.

Similarly, FIG. 10 illustrates another friction stir weld lap joint 160 formed between two structural members 152, 154 formed of 7050 aluminum. The joint 160 shown in FIG. 10 was formed with a friction stir welding tool 110 defining a first pin portion 120 having a length about 0.04 inch greater than the thickness T of the first structural member 152 so that the contour surface 122 was configured about 0.04 inch below the interface 156 during welding. As illustrated in FIG. 10, the interface 156 is deformed only slightly at each side 162, 164 of the joint 160, and the material at the interface 156 is well mixed.

It is appreciated that the friction stir weld tool 110 can be moved through the workpiece 150 along a path that defines the desired configuration of the friction stir weld joint 160. The path of the tool 110 and, hence, the joint 160 can be formed in any desired configuration in the workpiece 150. In addition, the joint 160 can extend from an edge of the workpiece 150, i.e., by configuring the tool 110 at an edge of the workpiece 150, rotating the tool 110, and urging the tool 110 against and through the workpiece 150. Thus, the shoulder 112 contacts the surface of the workpiece 150, thereby constraining the axial movement of the plasticized material of the workpiece 150, and the pin portions 120, 130 plasticize and mix the material of the workpiece 150. Alternatively, the weld joint 160 can begin or end at a point inward from the edge of the workpiece 150, e.g., by urging, or "plunging," the tool 110 into the workpiece 150 at the start of the weld joint 160, and/or subsequently retracting the tool 110 therefrom after welding.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A rotatable tool for friction stir welding a workpiece, the tool comprising:
   a first pin portion structured to extend longitudinally from a shoulder, the shoulder extending in a direction generally perpendicular to the longitudinal axis of the first pin portion, the first pin portion defining a contour surface opposite the shoulder; and
   a second pin portion extending longitudinally from the contour surface of the first pin portion, the second portion having a width in a transverse direction that is smaller than a width of the first pin portion,
   wherein the shoulder is structured to be urged against the workpiece with the first and second pin portions disposed at least partially in the workpiece, and the contour surface of the first pin portion defines at least one ridge extending in a spiral configuration.

2. A tool according to claim 1 wherein the ridge of the contour surface extends in a continuous spiral configuration from the second pin portion to an outer diameter of the contour surface.

3. A tool according to claim 1 wherein the first pin portion defines a cylindrical outer surface.

4. A tool according to claim 1 wherein the second pin portion is tapered in the longitudinal direction away from the contour surface.

5. A tool according to claim 1 wherein the second pin portion defines at least one feature extending radially therefrom.

6. A tool according to claim 1 wherein the second pin portion defines a generally helical thread extending from an outer surface thereof.

7. A tool according to claim 1 wherein the contour surface is generally parallel to the shoulder.

8. An apparatus for forming a friction stir weld lap joint in a workpiece including first and second structural portions in a lap configuration and defining an interface therebetween, the apparatus comprising:
   a rotatable tool having a shoulder, a first pin portion, and a second pin portion, the first pin portion extending longitudinally from the shoulder and having opposite the shoulder a contour surface defining at least one ridge extending in a spiral configuration, the second pin portion extending longitudinally from the contour surface and having a width in a transverse direction that is smaller than a width of the first pin portion; and
   an actuator connected to the tool and configured to rotate the tool and urge the tool in a longitudinal direction substantially perpendicular to the interface such that the shoulder is urged against the workpiece, the first pin portion pin extends at least partially through the first structural portion, the second pin portion extends at least partially through the second structural portion, the first and second pin portions thereby plasticizing a portion of the workpiece and forming a friction stir weld lap joint therein.

9. An apparatus according to claim 8 wherein the ridge of the contour surface extends in a continuous spiral configuration from the second pin portion to an outer diameter of the contour surface.

10. An apparatus according to claim 8 wherein the first pin portion defines a cylindrical outer surface.

11. An apparatus according to claim 8 wherein the second pin portion is tapered in the longitudinal direction away from the contour surface.

12. An apparatus according to claim 8 wherein the second pin portion defines at least one feature extending radially therefrom.

13. An apparatus according to claim 8 wherein the second pin portion defines a generally helical thread extending from an outer surface thereof.

14. An apparatus according to claim 8, further comprising the workpiece defining the first and second structural portions in a lap configuration with the interface therebetween, wherein the first pin portion defines a length in the longitudinal direction corresponding substantially to a thickness of the first structural portion of the workpiece such that the contour surface is disposed within about 0.050 inch from the interface when the shoulder is urged against the first structural portion.

15. An apparatus according to claim 8, further comprising the workpiece defining the first and second structural portions in a lap configuration with the interface therebetween, wherein the first pin portion defines a length in the longitudinal direction corresponding substantially to a thickness of the first structural portion of the workpiece such that the contour surface is disposed within about 0.030 inch from the interface when the shoulder is urged against the first structural portion.

16. An apparatus according to claim 8 wherein the contour surface is generally parallel to the shoulder.

17. An apparatus for forming a friction stir weld lap joint in a workpiece including first and second structural portions in a lap configuration and defining an interface therebetween, the apparatus comprising:
    a rotatable tool having a shoulder, a first pin portion, and a second pin portion, the first pin portion extending longitudinally from the shoulder and having opposite the shoulder a contour surface defining at least one ridge extending in a spiral configuration, the second pin portion extending longitudinally from the contour surface and having a width in a transverse direction that is smaller than a width of the first pin portion; and
    an actuator connected to the tool and configured to rotate the tool and urge the tool in a longitudinal direction substantially perpendicular to the interface such that the shoulder is urged against the workpiece, the first pin portion pin extends at least partially through the first structural portion, the second pin portion extends at least partially through the second structural portion, the first and second pin portions thereby plasticizing a portion of the workpiece and forming a friction stir weld lap joint therein,
    wherein the shoulder defines a contour surface for frictionally engaging the workpiece.

18. A method for forming a friction stir weld lap joint in a workpiece, the method comprising:
    positioning at least one structural member in an overlapping configuration to define an interface between a first structural portion and a second structural portion;
    rotating a friction stir welding tool defining a shoulder and a pin extending therefrom; and
    urging the friction stir welding tool in a longitudinal direction substantially perpendicular to the interface such that the shoulder is disposed against the first structural portion and the pin extends through the interface with a first portion of the pin extending longitudinally from the shoulder at least partially through the first structural portion to a contour surface of the first pin portion defining at least one ridge extending in a spiral configuration, a second portion of the pin extending longitudinally from a contour surface of the first pin portion at least partially through the second structural portion such that the first and second pin portions thereby plasticize a portion of the workpiece and form a friction stir weld joint therein.

19. A method according to claim 18 wherein said rotating and urging steps comprise mixing the plasticized portion of the workpiece with a ridge on the contour surface extending in a continuous spiral configuration from the second pin portion to an outer diameter of the contour surface.

20. A method according to claim 18 wherein said rotating and aging steps comprise mixing the plasticized portion of the workpiece with at least one feature extending radially from the second pin portion.

21. A method according to claim 18 wherein said urging step comprises urging the shoulder against the first structural portion such that the contour surface is disposed within about 0.050 inch from the interface.

22. A method according to claim 18 wherein said urging step comprises urging the shoulder against the first structural portion such that the contour surface is disposed within about 0.030 inch from the interface.

23. A method according to claim 18 further comprising providing the workpiece, the workpiece comprising at least one of the group consisting of aluminum, aluminum alloys, titanium, titanium alloys, copper, copper alloys, magnesium, magnesium alloys, and ferrous alloys.

24. A tool according to claim 1 wherein the shoulder defines a contour surface for frictionally engaging the workpiece.

25. A rotatable tool for friction stir welding a workpiece, the tool comprising:
    a first pin portion extending from a shoulder and defining a contour surface; and
    a second pin portion extending from the contour surface of the first pin portion,
    wherein both the first pin portion and the second pin portion are configured to be able to frictionally engage the workpiece during a friction stir welding procedure.

26. A tool for use in friction stir welding, the tool comprising:
    a shoulder including a contour surface;
    a first pin portion extending from the contour surface of the shoulder; and
    a second pin portion extending from the first pin portion.

27. The tool of claim 26 wherein the contour surface of the shoulder is structured to frictionally engage a workpiece.

28. The tool of claim 26 wherein the contour surface of the shoulder includes one or more frictional features.

29. The tool of claim 26 wherein the contour surface of the shoulder includes raised portions.

30. The tool of claim 26 wherein the contour surface of the shoulder includes threads.

31. The tool of claim 26 wherein the contour surface of the shoulder includes a spiral thread.

32. The tool of claim 26 wherein the first pin portion includes a contour surface.

33. The tool of claim 26 wherein the tool is rotatable about a longitudinal axis and wherein:
    the first pin portion extends longitudinally from the shoulder; and the second pin portion extends longitudinally from the first pin portion.

34. The tool of claim 33 wherein the first pin portion includes a contour surface from which the second pin portion extends.

35. The tool of claim 34 wherein the second pin portion includes a contour surface.

36. The tool of claim 35 wherein the contour surface of the second pin portion includes a thread.

37. The tool of claim 36 wherein the second pin portion is frustum shaped.

38. A method of friction stir welding in a workpiece, the method comprising:

rotating a tool comprising:

a shoulder including a contour surface; and a first pin portion extending from the contour surface of the shoulder; and engaging the workpiece with the contour surface of the shoulder.

\* \* \* \* \*

UNITED STATES PATENT AND TRADEMARK OFFICE
CERTIFICATE OF CORRECTION

PATENT NO. : 6,994,242 B2 Page 1 of 1
APPLICATION NO. : 10/731849
DATED : February 7, 2006
INVENTOR(S) : Fuller et al.

It is certified that error appears in the above-identified patent and that said Letters Patent is hereby corrected as shown below:

Column 10,
Line 14, "aging" should read --urging--.

Signed and Sealed this

Fourth Day of July, 2006

JON W. DUDAS
*Director of the United States Patent and Trademark Office*